(12) United States Patent
Moran et al.

(10) Patent No.: US 12,081,434 B1
(45) Date of Patent: Sep. 3, 2024

(54) LOW POWER SWITCH

(71) Applicant: XSIGHT LABS LTD., Kiryat Gat (IL)

(72) Inventors: Gil Moran, Kiryat Gat (IL); Guy Koren, Rishon Lezion (IL); Gal Malach, Gedera (IL)

(73) Assignee: XSIGHT LABS LTD., Kiryat Gat (IL)

( * ) Notice: Subject to any disclaimer, the term of this patent is extended or adjusted under 35 U.S.C. 154(b) by 160 days.

(21) Appl. No.: 17/449,666

(22) Filed: Sep. 30, 2021

Related U.S. Application Data

(60) Provisional application No. 63/198,170, filed on Oct. 1, 2020.

(51) Int. Cl.
*H04L 45/74* (2022.01)

(52) U.S. Cl.
CPC .................................. *H04L 45/74* (2013.01)

(58) Field of Classification Search
CPC ....................................................... H04L 45/74
See application file for complete search history.

(56) References Cited

U.S. PATENT DOCUMENTS

| | | | |
|---|---|---|---|
| 8,155,113 B1* | 4/2012 | Agarwal | G06F 9/30123 710/316 |
| 10,511,523 B1* | 12/2019 | Bosshart | H04L 43/04 |
| 10,721,167 B1* | 7/2020 | Bosshart | H04L 49/103 |
| 11,424,983 B2* | 8/2022 | Chang | H04L 49/501 |
| 2010/0191911 A1* | 7/2010 | Heddes | G06F 15/16 711/E12.091 |
| 2019/0238665 A1* | 8/2019 | Bosshart | H04L 45/745 |
| 2021/0194800 A1* | 6/2021 | Bosshart | H04L 69/325 |
| 2022/0091754 A1* | 3/2022 | Raman | G06F 3/0613 |

* cited by examiner

*Primary Examiner* — Yemane Mesfin
*Assistant Examiner* — Salma Ayad
(74) *Attorney, Agent, or Firm* — Reches Patents

(57) ABSTRACT

A data plane integrated circuit that includes interfacing units (IFUs), Datapath units (DPUs); and a network on chip (NoC). The DPUs are arranged in local sets of DPUs that are proximate to each other, each local set is configured to (a) store an instance of packet header processing control data structures and (b) independently perform local packet header processing and transmission scheduling.

20 Claims, 8 Drawing Sheets

LOW POWER SWITCH

BACKGROUND

To reduce datacenters' operation expense (OPEX) it is important to build the datacenter with low power components. Low power components reduce OPEX directly by consuming less power, and indirectly by requiring smaller cooling systems which in turn consume less power for their operation.

The components that directly contribute to the datacenter's revenue are the servers, used for data processing, storage devices, used to store user data and computing results, and network switches that connect among the servers, storage and datacenter users. Being the core of the datacenter, it is important to reduce their power consumption. The datacenters may include multiple Ethernet switches.

An Ethernet switch is built from multiple components described in FIG. 1: Power Supply, Fans, Ports and PCB (Printer Circuit Board) hosting logical components with the main being the Control Plane (the CPU subsystem) and the data plane subsystem, built from one or more switching Application Specific Integrated Circuit (ASIC)s.

The switch Data plane subsystem is responsible for packet-by-packet processing. Its main functions (per packet) are: (1) decide to forward/filter a packet, (2) if forward, decide the destination port, (3) if forward, decide when to transmit the packet and queue the packet until it is scheduled for transmission.

The data plane subsystem is the main power consumer in the switch making it the main candidate for power reduction/management.

There are multiple known methods used for power management/reduction, categorized as follows:

Some are Semiconductor process related techniques—these techniques save power by taking advantage of the process shrinkage (e.g. from 24 nm to 16 nm, to 7 nn, etc.)—for example process shrinkage comes with using lower voltage—saves power.

Semiconductor cells evolution—these involve circuit level design of basic cells that consume less power.

Backend flow evolution—improved tools may reduce power by for example, adding clock gating cells in an efficient manner These power reduction techniques mentioned so far are general in the sense that they can be applied to any semiconductor device, regardless of its functionality.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
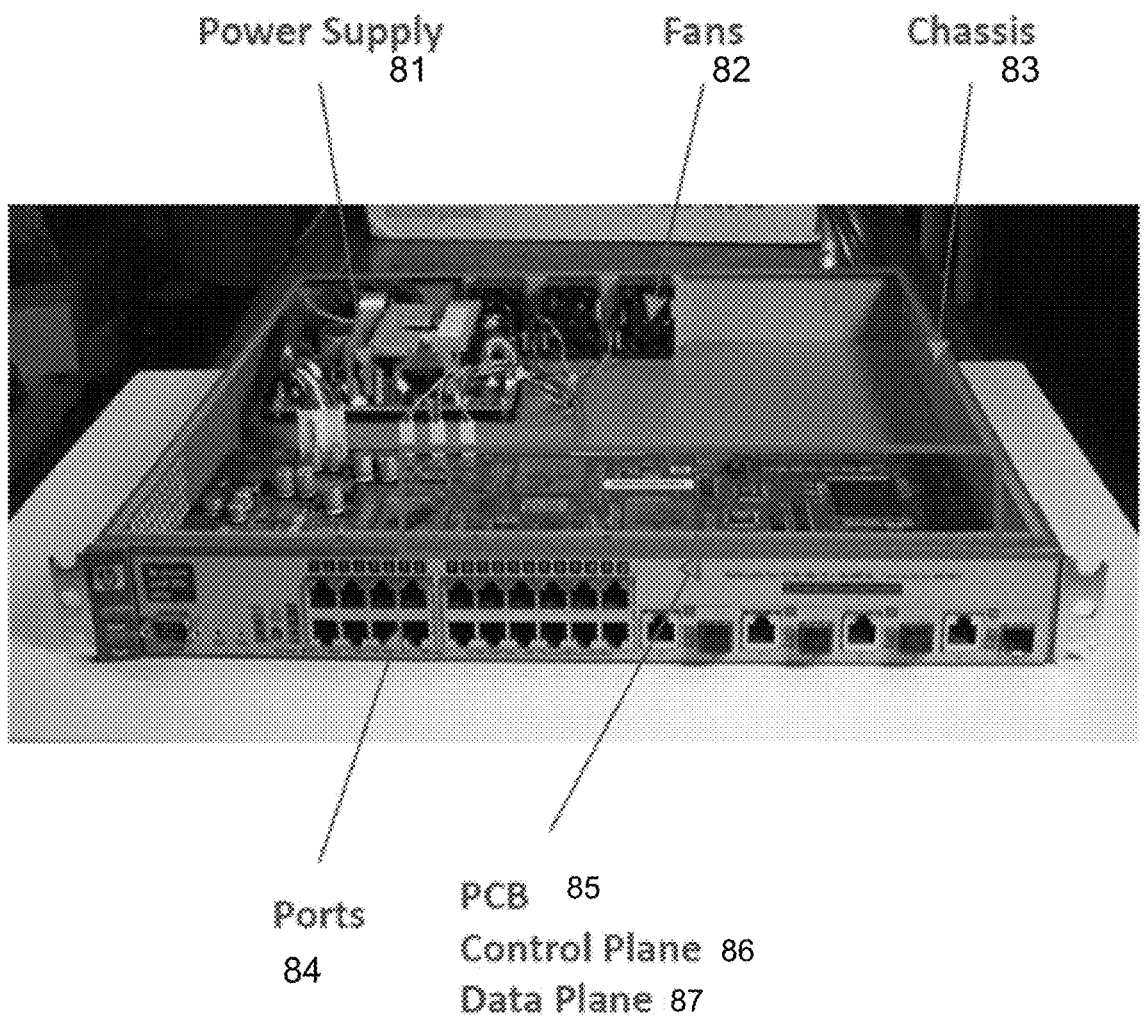
FIG. 1 is an example of a switch.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executadata structure by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

There is provided a solution that may apply one or more power reduction (aka power management) techniques in network switches and in particular, in the switch data plane subsystem.

The power reduction may be achieved by using power reduction techniques derived from specific architecture and floorplan for implementing switch data plane ASIC (Application-specific integrated circuit).

There may be provided a data plane integrated circuit that may include (a) interfacing units (IFUs) that comprise input IFUs and output IFUs; (b) data path units (DPUs); and (c) a network on chip (NoC) in communication with the IFUs and the DPUs. The DPUs are arranged in local sets. Different local sets may have a same number of DPUs, and/or be of a same shape. One of more local sets may differ from each other by a number of DPUs, and/or by a shape.

Each local set may include DPUs that are proximate to each other. Proximate may mean that a maximal distance between members of the local set does not exceed a threshold. The threshold may be a predefined number (for example 2, 3, 4, 5 and the like) or a predefined fraction from a number of DPUs of the data plane integrated circuit (for example 9/256, and the like).

Each local set is configured to (a) store an instance of packet header processing control data structures and (b) independently perform local packet header processing and transmission scheduling. Any scheduling process may be applied. The content of the control data structure may be arranged in other formats—not within a data structure.

Figure 2:
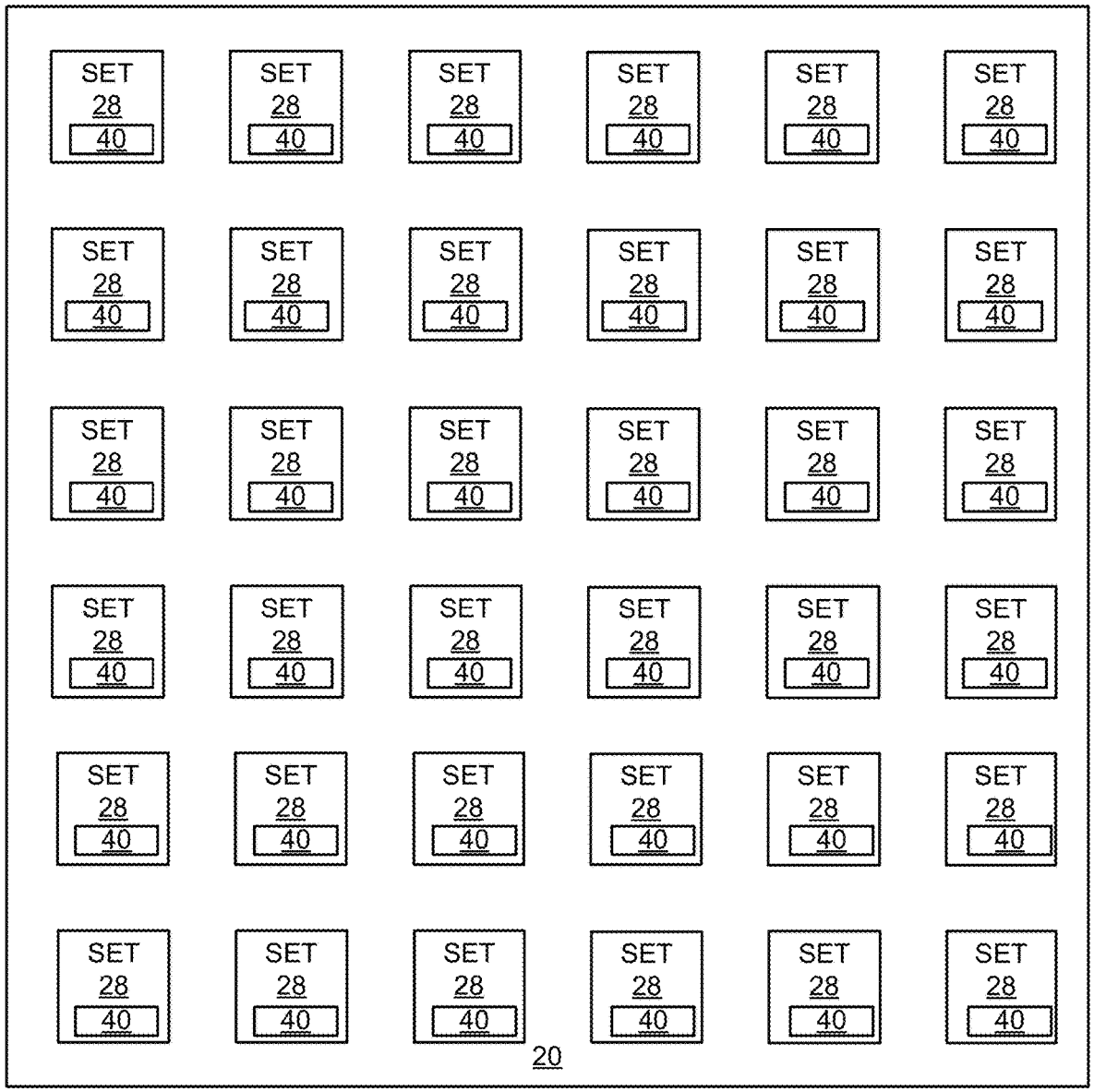
FIG. 2 is an example of a part of a data plane integrated circuit.

FIG. 2 illustrates an example of an array (or grid or matrix) 20 of sets 28 of DPUs, each set stores an instance of control data structures 40.

Figure 3:
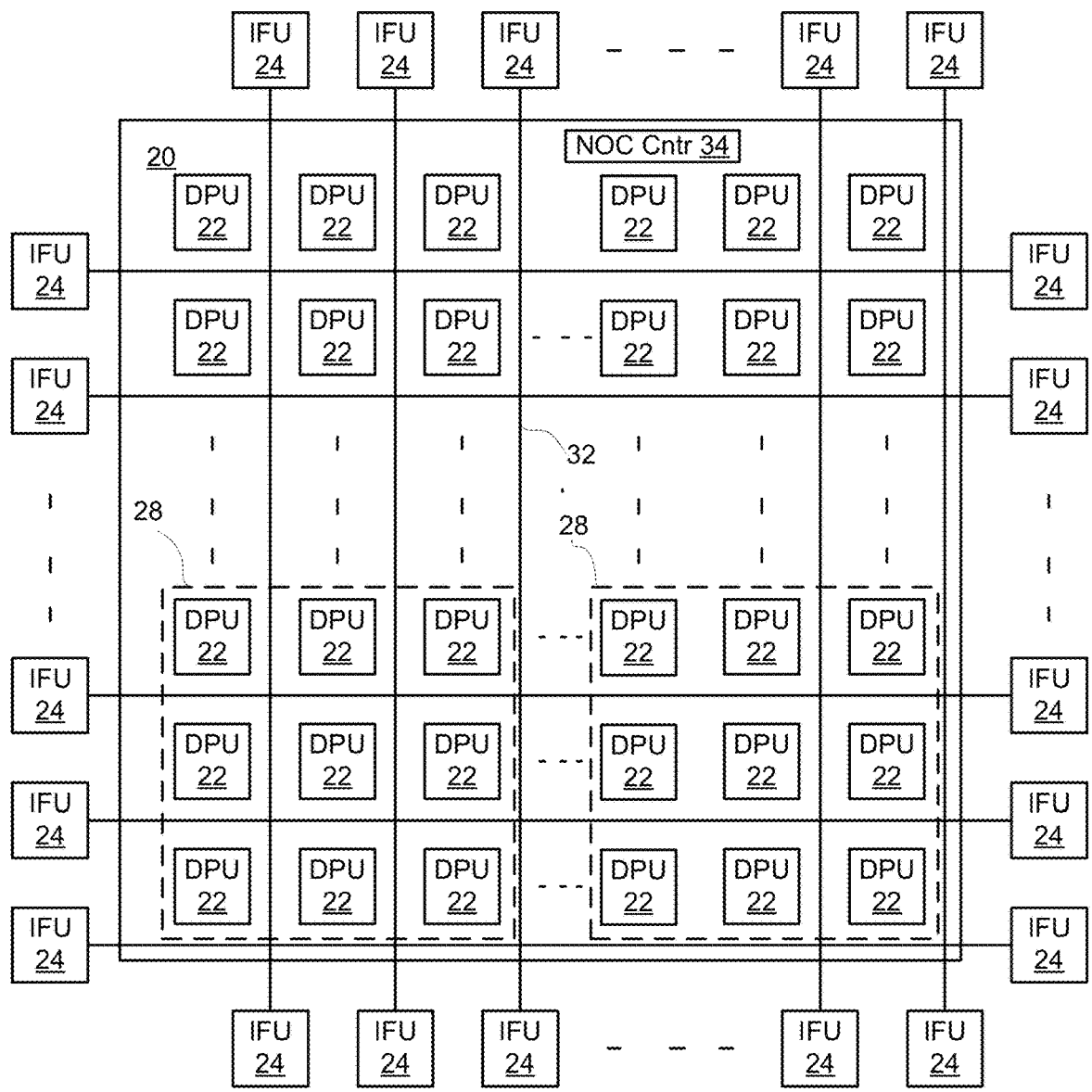
FIG. 3 is an example of a data plane integrated circuit.

FIG. 3 illustrates an example of a data plane integrated circuit 10 that include IFUs 24, DPUs 22, and NoC that includes buses 32 and one or more controllers or arbitrators (such as NOC Cntr 34) for controlling traffic over buses 32. Two sets, each including 3×3 DPUs are also shown.

An input interfacing unit (IFU) may be configured to (a) receive a data packet aimed to a packet target output IFU; (b) segment the data packet to cells; (c) distribute the cells to different DPUs of a local set associated with the IFU. The local set may be associated with the input IFU when the local set is the closest set to the IFU.

A local set associated with the input IFU may be configured to (a) locally perform packet header processing, and (b) schedule a transmission of the cells over the NoC and to the packet target output IFU.

Each local set may consists essentially of neighboring DPUs.

The target IFU may be configured to reassemble a data packet from the cells and to output the data packet from the data plane integrated circuit.

The cells may include a header including cell and one or more non-header cells. The input IFU may be configured to send the header including cell to a processing DPU and to send the one or more non-header cells to buffering DPUs.

The maximal distance between DPUs of local set may not exceed three, four, five, or six DPUs.

The DPUs are arranged in a grid and DPUs of at least one local set are also arranged in a grid.

The each IFU may be configured to (a) receive a data packet aimed to a packet target output IFU; (b) segment the data packet to cells; (c) distribute the cells to different DPUs of a local set associated with the IFU.

For each input IFU, a local set associated with the IFU may be configured to (a) locally perform packet header processing, and (b) schedule a transmission of the cells over the NoC and to the packet target output IFU.

At least some of the DPUs include a cache.

At least one local set consists essentially of N by N DPUs, and wherein a number of cells equals N, N being a positive integer. For example—in FIG. 4 N equals 3.

Each local set may be configured to store different portions of the instance of packet header processing control data structures at different DPUs of the local set. See for example portions 40(1)-40(5) stores in set 28 of FIG. 5.

The number of portions may differ from five. The allocations of portions within the set may differ from those illustrated in FIG. 5.

There may be one or more DPUs per set that may not store any portion of the control data structures. Alternatively—there may be a set in which each DPU stores a portion of the control data structures.

Packet Payload Travel

Figure 4:
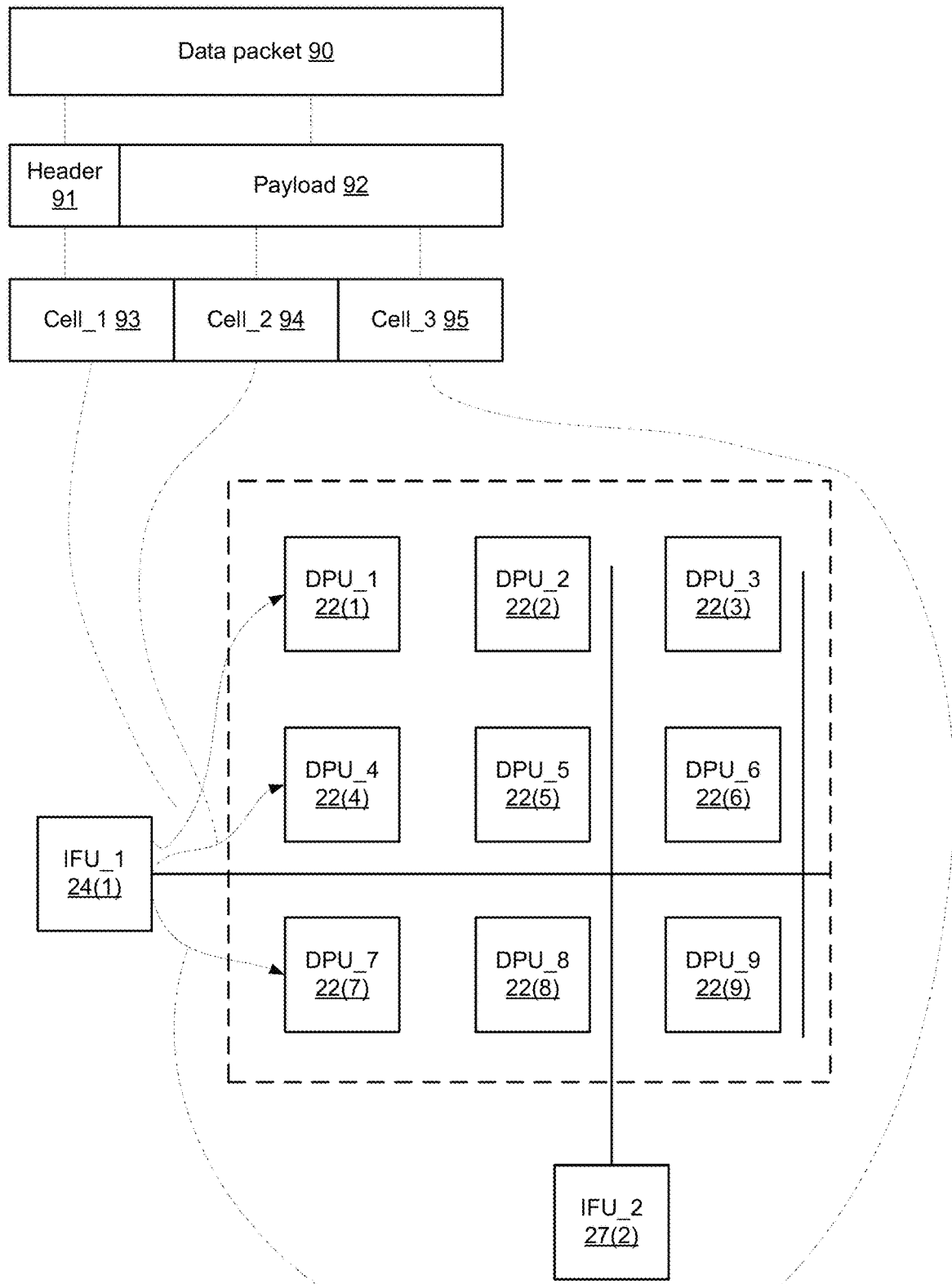
FIG. 4 is an example of one or more steps of a method executed by the data plane integrated circuit of FIG. 2.

FIG. 4 shows an example of packet payload traveling through the data plane integrated circuit. In this example, a packet is received on a network port located in input IFU_1 24(1) and is transmitted over a network port located in target IFU_2 24(2). Input IFU_1 24(1) segments the packet into non-overlapping chunks called "cells"—for example—data packet 90 includes a header 91 and payload 92 and is segmented to cells cell_1 93, cell_2 94 and cell_3 95. Cell_1 include header 91 and is referred to as header including cell. Cell_2 and cell_3 are referred to as non-header cells.

IFU_1 is configured to send cell_1 to DPU_1 22(2), to send cell_2 to DPU_4 22(4) and to send cell_3 to DPU_7 22(7). In this example DPU_1 acts as a processing DPU, whereas DPU_4 and DPU_7 acts as buffering DPUs.

Figure 6:
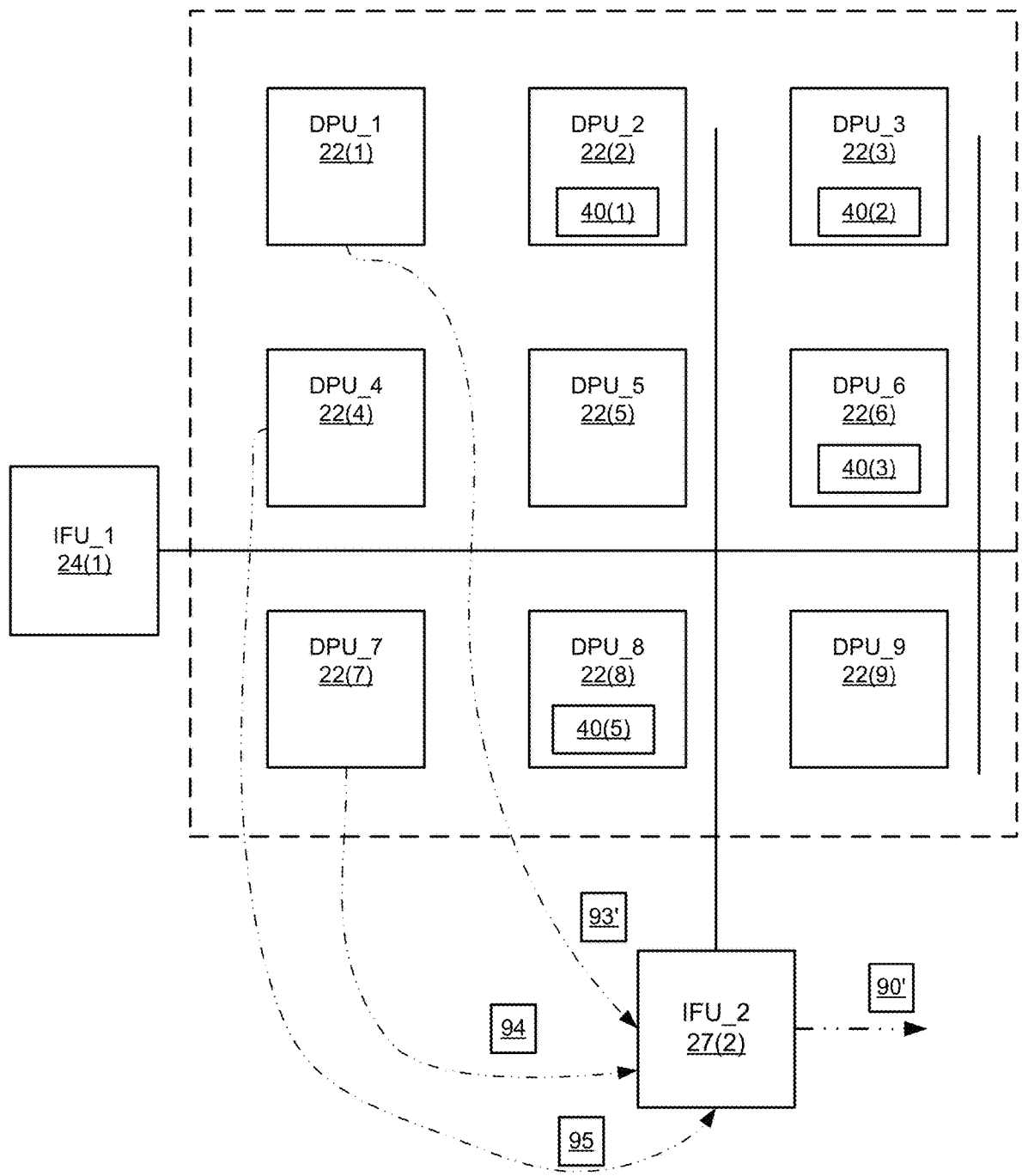
FIG. 6 is an example of one or more steps of a method executed by the data plane integrated circuit of FIG. 1.

Cell_1 may be processed by the processing DPU, to provide a processed cell_1 (denoted 93' in FIG. 6).

Following the processing, when the packet is scheduled for transmission, the cells (see for example FIG. 6) are read from the buffering DPUs and are being reassembled back to a packet by IFU_2. The reassembled packet (denoted 90' in FIG. 6) is then transmitted to the network.

In this particular architecture, the packet travel distance in the device is the minimum possible.

Packet Processing Travel

Figure 5:
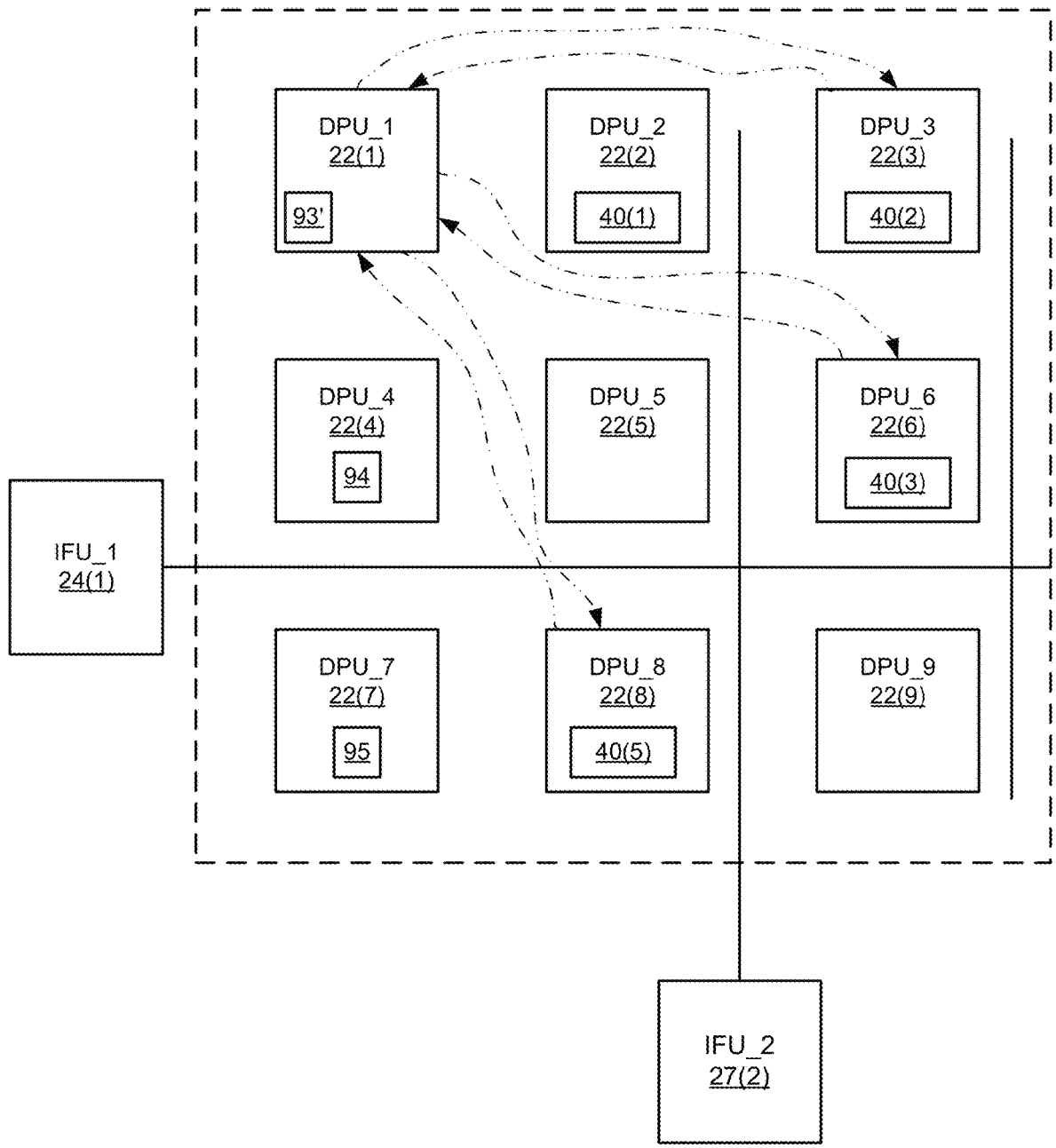
FIG. 5 is an example of one or more steps of a method executed by the data plane integrated circuit of FIG. 2.

FIG. 5 shows an example of packet header processing by the local set 28.

As illustrated in FIG. 4—data packet 90 is received on a network port located in IFU_1 24(1), segmented to 3 cells (93, 94 and 95), and written to DPU_1, DPU_4 and DPU_7.

DPU_1 acts as a Processing DPU and performs packet header processing.

The packet header processing includes querying multiple portions of the control data structures.

For example, the packet filtering function queries a security database (may span along one or more portions of the control data structures), while a forwarding function queries a forwarding database (may span along at least one portion of the control data structures).

In FIG. 5 the processing DPU access portion 40(2) stored in DPU_3 22(3), accesses portion 40(3) stored in DPU_6 22(6) and accesses portion 40(5) stored in DPU_8 22(8).

FIG. 5 describes three queries applied to different neighbor DPUs. The reason for querying only the neighbors DPUs is the allocation of the control data structures to DPUs.

While the data plane integrated circuit architecture allows allocating any data structure portion to any DPU of the data plane integrated circuit, power reduction (as well as other factors) call for locality in allocation. This results in short query distance.

The storage of an instance of the control data structures within set 28—allows queries to any portion of the control data structures to up to four hops for any Processing DPU.

This allows flexible allocation of control data structure portions to DPUs is holding both buffering and control memories in every DPU. The buffering memory is for packet payload buffering and the control memory is for control data structures.

The DPU holds shared memory for buffering and control data structures. This adds another level of flexibility compared to split buffer control.

FIG. 6 illustrates a transmission of cells where the input IFU and the packet target output IFU are associated with the same set of DPUs.

Figure 7:
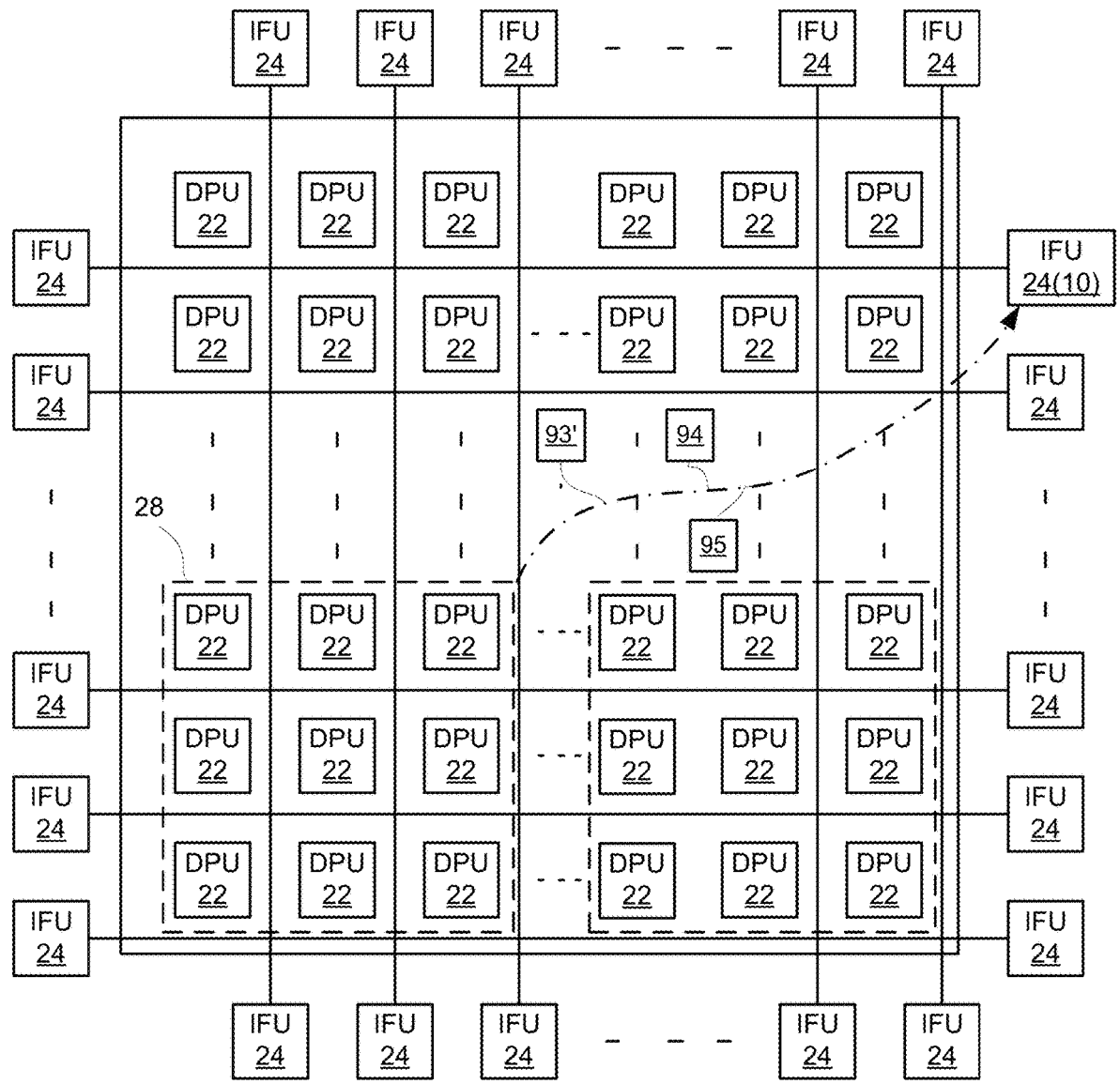
FIG. 7 is an example of one or more steps of a method executed by the data plane integrated circuit of FIG. 1.

FIG. 7 illustrates a transmission of cells where the input IFU differs from the packet target output IFU.

Power Save Techniques Offered by the data plane integrated circuit.

Power Save by Packet Storage Locality—this results in short average travel distance of packet payloads from the ingress port to the egress port. Compared the architectures that use centralized memory.

Power Save By Processing Locality—Packet processing lookup query travel distance is shortened thanks to the locality of the control data structures. Depicted in FIG. 4. In addition—the use of caches in packet processing shorten the travel distance to 0 (save the NoC transaction).

Power Save By Run to Completion Processing—Packet header/metadata are written/read once to scratchpad/L2_cache (Layer-2 cache), Processing operations are done on parts of the packet header resulting in less information being read/write to/from scratchpad/L2_cache.

The suggested solution may apply one or more of the mentioned above power saving techniques.

The suggested solution exhibits locality—reduction on a packet payload average travel distance, reduction in Packet processing lookup travel distance, and using caches in packet processing—reducing complexity and timing issues related to retrieving information from remote memory units.

The suggested solution exhibits a highly efficient Run to completion processing (vs processing pipeline or multi-thread processing). Packet header/metadata are written/read once to scratchpad/L2_cache. Processing operations are done on parts of the packet resulting in less information being read/write to/from scratchpad.

Figure 8:
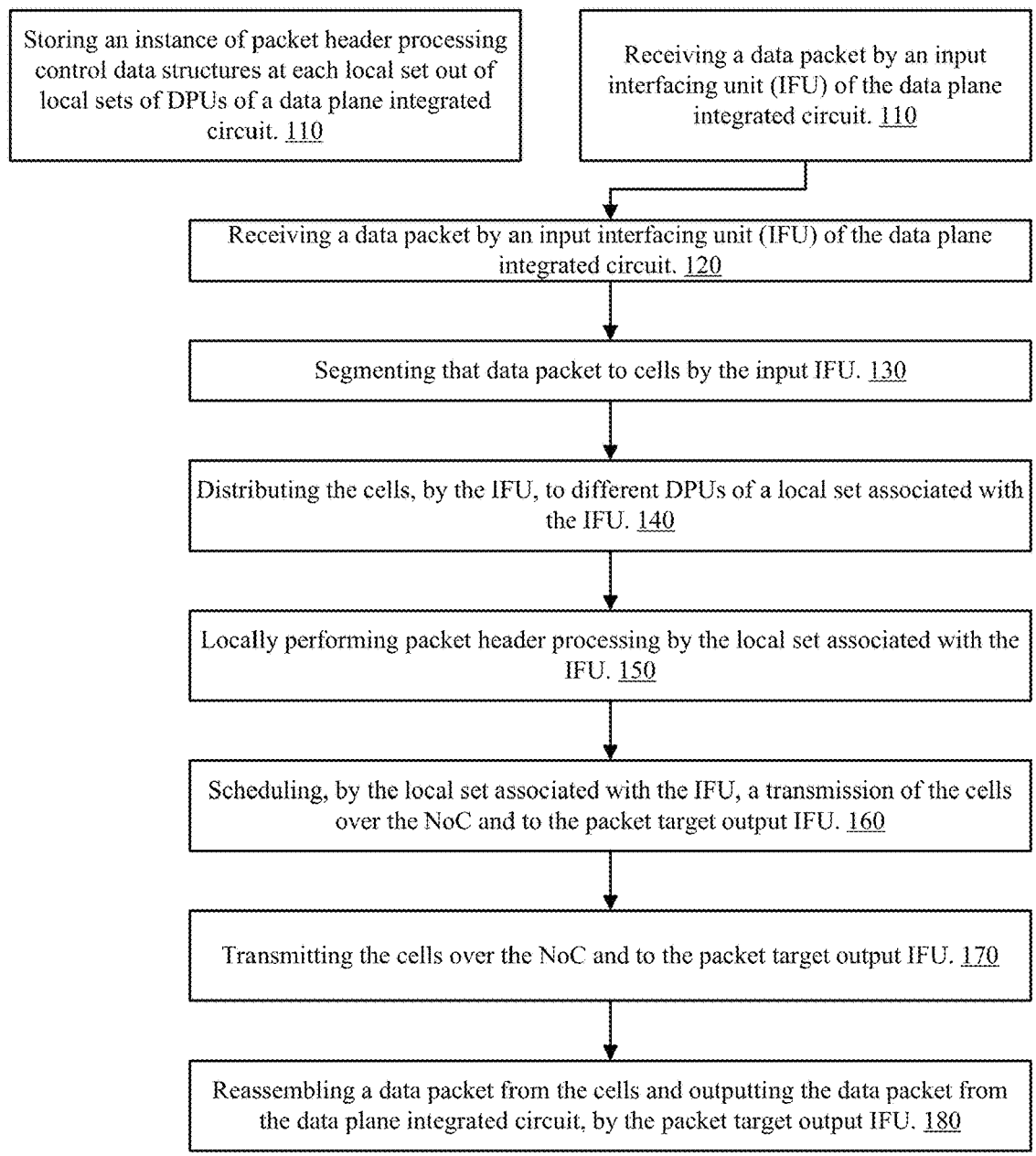
FIG. 8 is an example of a method.

FIG. 8 illustrates a method 100 for data plane processing.

Method 100 may start by step 110 of storing an instance of packet header processing control data structures at each local set out of local sets of data path units (DPUs) of a data plane integrated circuit.

The data plane integrated circuit further includes (i) interfacing units (IFUs) that comprise input IFUs and output IFUs; and a network on chip (NoC) in communication with the IFUs and the DPUs. Each local set includes DPUs that are proximate to each other.

Step 110 may include storing different portions of the instance of packet header processing control data structures at different DPUs of the local set.

Method 100 may also include step 120 of receiving a data packet by an input interfacing unit (IFU) of the data plane integrated circuit. The data packet is aimed to a packet target output IFU.

Step 120 may be followed by step 130 of segmenting that data packet to cells by the input IFU.

Step 130 may be followed by step 140 of distributing the cells, by the IFU, to different DPUs of a local set associated with the IFU.

Step 140 may be followed by step 150 of locally performing packet header processing by the local set associated with the IFU.

Step 150 may be followed by step 160 of scheduling, by the local set associated with the IFU, a transmission of the cells over the NoC and to the packet target output IFU.

Step 160 may be followed by step 170 of transmitting the cells over the NoC and to the packet target output IFU.

Step 170 may be followed by step 180 of reassembling a data packet from the cells and outputting the data packet from the data plane integrated circuit, by the packet target output IFU.

The cells may include a header including cell and one or more non-header cells.

Step 130 may include sending the header including cell to a processing DPU and sending the one or more non-header cells to buffering DPUs.

Steps 130, 140, 150, 160 and 170 may be executed for different data packets received by different input IFUs and aimed to different packets output IFUs.

Method 100 may include caching by least some of the DPUs.

Any numeric example provided in the specification or drawings is merely a non-limiting example. For example— (a) the numbers of IFUs, the number of NoC buses, and the number of sets of DPUs may differ from those illustrated in FIG. 3, (b) the number of DPUs per set may differ from nine, (c) the number of cells per data packet may differ from three, (d) the number of portions of the control data structure may differ from five.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suidata structure manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suidata structure sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A data plane integrated circuit, comprising:
    interfacing units (IFUs) that comprise input IFUs and output IFUs;
    data path units (DPUs); and
    a network on chip (NoC) in communication with the IFUs and the DPUs;
    wherein the DPUs are arranged in local sets;
    wherein each local set comprises DPUs that are proximate to each other;
    wherein each local set is configured to (a) store an instance of packet header processing control data structures and (b) independently perform local packet header processing and transmission scheduling, the local packet header processing and transmission scheduling comprises querying multiple portions of the packet header processing control data structures, the packet header processing control data structures differ from packet headers;
    wherein an input interfacing unit (IFU) is configured to (a) receive a data packet aimed to a packet target output IFU; (b) segment the data packet to cells; (c) distribute the cells to different DPUs of a local set associated with the input IFU;
    wherein the local set associated with the input IFU is configured to (a) locally perform packet header processing, and (b) schedule a transmission of the cells over the NoC and to the packet target output IFU.

2. The data plane integrated circuit according to claim 1 wherein each local set consists essentially of neighboring DPUs.

3. The data plane integrated circuit according to claim 1 wherein the target output IFU is configured to reassemble a data packet from the cells and to output the data packet from the data plane integrated circuit.

4. The data plane integrated circuit according to claim 1 wherein the cells comprise a header including cell and one or more non-header cells; wherein the input IFU is configured to send the header including cell to a processing DPU and to send the one or more non-header cells to buffering DPUs.

5. The data plane integrated circuit according to claim 1 wherein a maximal distance between DPUs of local set does not exceed three DPUs.

6. The data plane integrated circuit according to claim 1 wherein the DPUs are arranged in a grid and wherein DPUs of at least one local set are also arranged in a grid.

7. The data plane integrated circuit according to claim 1 wherein each IFU is configured to (a) receive a data packet aimed to a packet target output IFU; (b) segment the data packet to cells; (c) distribute the cells to different DPUs of a local set associated with the input IFU.

8. The data plane integrated circuit according to claim 7, wherein for each input IFU, a local set associated with the input IFU is configured to (a) locally perform packet header processing, and (b) schedule a transmission of the cells over the NoC and to the packet target output IFU.

9. The data plane integrated circuit according to claim 1 wherein at least some of the DPUs comprise a cache.

10. The data plane integrated circuit according to claim 1 wherein at least one local set consists essentially of N by N DPUs, and wherein a number of cells equals N, N being a positive integer.

11. The data plane integrated circuit according to claim 1 wherein each local set is configured to store different portions of the instance of packet header processing control data structures at different DPUs of the local set.

12. A method for data plane processing comprising:
    storing an instance of packet header processing control data structures at each local set out of local sets of Datapath units (DPUs) of a data plane integrated circuit; wherein the data plane integrated circuit further comprises (i) interfacing units (IFUs) that comprise input IFUs and output IFUs; and a network on chip (NoC) in communication with the IFUs and the DPUs; wherein each local set comprises DPUs that are proximate to each other;

receiving a data packet by an input interfacing unit (IFU) of the data plane integrated circuit; the data packet is aimed to a packet target output IFU;

segmenting that data packet to cells by the input IFU;

distributing the cells, by the IFU, to different DPUs of a local set associated with the input IFU;

locally performing packet header processing by the local set associated with the input IFU; and scheduling, by the local set associated with the input IFU, a transmission of the cells over the NoC and to the packet target output IFU, wherein the locally performing packet header processing and the scheduling comprise querying multiple portions of the packet header processing control data structures, the packet header processing control data structures differ from packet headers.

13. The method according to claim 12 comprising reassembling, by the target output IFU, a data packet from the cells and outputting the data packet from the data plane integrated circuit.

14. The method according to claim 12 wherein the cells comprise a header including cell and one or more non-header cells; wherein the distributing the of cells comprises sending the header including cell to a processing DPU and sending the one or more non-header cells to buffering DPUs.

15. The method according to claim 12 wherein the storing of the instance of packet header processing control data structures at each local set comprises storing different portions of the instance of packet header processing control data structures at different DPUs of the local set.

16. A non-transitory computer readable medium that stores instructions that once executed by a processing circuit, cause the processing circuit to:

store an instance of packet header processing control data structures at each local set out of local sets of data path units (DPUs) of a data plane integrated circuit; wherein the data plane integrated circuit further comprises (i) interfacing units (IFUs) that comprise input IFUs and output IFUs; and a network on chip (NoC) in communication with the IFUs and the DPUs; wherein each local set comprises DPUs that are proximate to each other;

receive a data packet by an input interfacing unit (IFU) of the data plane integrated circuit; the data packet is aimed to a packet target output IFU;

segment that data packet to cells by the input IFU;

distribute the cells, by the IFU, to different DPUs of a local set associated with the input IFU;

locally perform packet header processing by the local set associated with the input IFU; and schedule, by the local set associated with the input IFU, a transmission of the cells over the NoC and to the packet target output IFU;

wherein the locally performing packet header processing and the scheduling comprise querying multiple portions of the packet header processing control data structures, the packet header processing control data structures differ from packet headers.

17. The non-transitory computer readable medium according to claim 16, wherein the packet header processing control data structures comprise a security database and a forwarding database.

18. The non-transitory computer readable medium according to claim 16, wherein each DPU of the local set associated with the IFU comprises a buffering memory for packet payload buffering and a control memory for buffering at least one portion of at least one of the packet header processing control data structures.

19. The non-transitory computer readable medium according to claim 16, wherein each DPU of the local set associated with the IFU comprises a DPU shared memory for packet payload buffering and for buffering at least one portion of at least one of the packet header processing control data structures.

20. The non-transitory computer readable medium according to claim 16, wherein a first DPU of the local set associated with the IFU comprises a control memory for buffering at least one portion of at least one of the packet header processing control data structures, and a second DPU of the local set associated with the IFU lacks a control memory for buffering at least one other portion of the at least one of the packet header processing control data structures.

* * * * *